United States Patent Office 3,091,565
Patented May 28, 1963

3,091,565
INSECTICIDAL COMPOSITIONS CONTAINING O,O - DIMETHYL - O - (3 - METHYL - 4 - NITROPHENYL) - THIONOPHOSPHATE
Shinichi Suzuki, Sakai City, and Kuniyoshi Fujii, Yoshihiko Nishizawa, and Tadaomi Kadota, Toyonaka City, Japan, assignors to Sumitomo Chemical Company, Ltd., Higashi-ku, Osaka, Japan, a corporation of Japan
No Drawing. Filed Aug. 19, 1960, Ser. No. 50,573
Claims priority, application Japan Sept. 23, 1959
8 Claims. (Cl. 167—30)

The present invention relates to insecticidal compositions containing a new organo-phosphoric acid ester. More particularly, the invention relates to low toxic insecticidal compositions containing O,O-dimethly-O-(3-methyl-4-nitrophenyl) thionophosphate of the following formula,

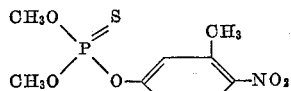

as an essential active ingredient. Furthermore, it relates to the method for killing agricultural injurious insects, especially borers of rice, for example, rice stem borer (*Chilo suppressalis* Walker), paddy borer (*Schoenobius incertellus* Walker), purplish stem borer (*Sesamia inferens* Walker), and others (such as *Chilo plejadellus* Zinck, *Chilotrea polychrysa* Meyr., *Scriprophaga albinella* Cramer, *Scirpophaga innotata* Walker, *Eldana dichromellus* Walker, and *Elasmopalpus lignosellus* Zeller), and sanitary injurious insects, especially house fly (*Musca domestica* Linne), and its larva, and the like.

Accordingly, an object of the present invention is to provide insecticidal composition suitable for agricultural and sanitary uses which have an extremely lower order of toxicity towards warm blooded animals, but have a very higher degree of insecticidal activity, compared with that of the conventional insecticides. Further object of the present invention is to provide a method for killing various kinds of agricultural and sanitary injurious pests by use of the above-mentioned composition. Other objects and advantages will be apparent from the description hereunder stated.

It has been well known that organo-phosphoric acid esters having 4-nitrophenyl radical therein possess a high degree of insecticidal activity and consequently are very useful as the active ingredient of agricultural chemicals. However, they have, at the same time, a very high degree of toxicity towards warm blooded animals and this is, indeed, the weak point of these compounds. Therefore, many attempts have been made to embody a compound having lower toxicity and higher insecticidal activity by the American and the German researchers and compounds such as Chlorthion (Farbenfabriken Bayer A.G.) and Dicapthon (American Cyanamid Co.) have been found as the results of their efforts. However, these so-called low toxic insecticidal compounds have really a certain degree of low toxicity but at the same time they cannot help being inferior to some extents in their insecticidal activities.

The present inventors have made various studies for the purpose of obtaining the compound which had a low toxicity and also a high degree of insecticidal activity, such compound being anxiously desired in rice producing districts. As the result, the inventors have succeeded in obtaining the present compound which has not only extremely low toxicity but also superior activity towards insects, compared with that of any conventional insecticidal compounds. Concretely speaking, such compounds as parathion, methyl parathion, EPN (Du Pont de Nemours, E.I., and Co.) and Dipterex (Farbenfabriken Bayer A.G.) have been utilized these days as a killing agent for borers of rice. However, even though the preceding three compounds indeed possess superior insecticidal activities towards borers of rice, they have, at the same time, a high degree of toxicity towards warm blooded animals, for example, the $LD_{50}$ value for mouse oral toxicity, of parathion being 6–10 mg./kg. of body weight, and therefore, close attention and careful management should be paid for the handling of the insecticidal compositions containing these compounds. On the other hand, it is true that Dipterex has a considerably lower toxicity towards warm blooded animals, but the insecticidal activity of the compound is inferior in proportion to that of the afore-said three compounds. Roughly speaking, about twice or thrice as much amount as the former compounds would be necessary to attain the same degree of control of borers of rice with the latter compound. Such a larger quantity would not be tolerable from an economical point of view. Consequently, in spite of extreme toxicity towards warm blooded animals, parathion preparations have commonly been utilized as the killing agent for borers of rice up to this time. However, the present compound of the invention, has, as minutely described hereinafter, about 100 times lower toxic effect than that of parathion and about several times lower than that of Dipterex (for example, oral toxicity towards mouse, $LD_{50}$ value, is 700–900 mg./kg. of body weight), so it may be said that the compound is substantially non-toxic. Moreover, as minutely described hereinafter with numerical values, the efficacy of the compound to borers of rice is not at all inferior to parathion, therefore it may fairly be said that the controlling problem of borers of rice comes to a perfect solution in fact by the appearance of the present invention.

O,O-dimethyl-O-(3-methyl-4-nitrophenyl) thionophosphate of the present invention is a new compound unknown in any preceding literature. In order to produce the compound according to the method of the invention, as shown in the following scheme of reaction,

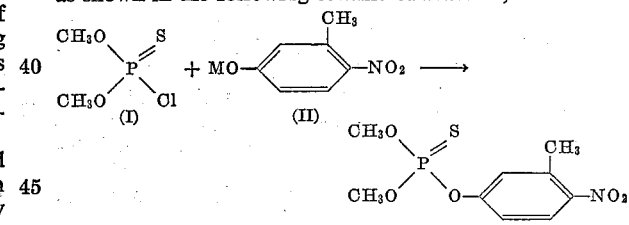

(wherein M stands for hydrogen or an alkali metal atom), O,O-dimethyl chlorothionophosphate (I) is condensed with a compound selected from the group consisting of 3-methyl-4-nitrophenol and its alkali metal salts (II).

O,O-dimethyl chlorothionophosphate utilized in the present process as a raw material is the known liquid compound and possesses the characteristic of B.P. 66° C./16 mm. Hg. 3-methyl-4-nitrophenol utilized as an another raw material is also prepared by any known method, for example by the method disclosed in J. Chem. Soc., 1924, 125, 307, and the compound may easily be converted to the salts by reacting the phenol with a compound such as caustic alkali, alkali carbonate, alkali metals and alkali metal alcoholates in water or an organic solvent. As for the said alkali, sodium or potassium is preferable.

In the method of this invention, the condensation reaction of these raw materials may successfully be carried out by mixing the two reactions at the ratio of at least equal molecular weights, or if possible, with excess of O,O-dimethyl chlorothionophosphate. In this case, it is preferable to carry out the reaction in an inert organic solvent by use of almost equimolar quantities of the said two compounds in general. That is, when O,O-dimethyl chlorothionophosphate is mixed with alkali metal 3-methyl-4-nitrophenolate in an inert organic solvent and then heated, a de-alkali metal chloride reaction takes place and the compound of this invention can be produced as the result. When free 3-methyl-4-nitrophenol is utilized in place of the said alkali metal 3-methyl-4-nitrophenolate, the present reaction proceeds according to the so-called de-hydrogen chloride reaction, and in such case, the said reaction may preferably be carried out in the presence of a well known deacidic agent, for example, such organic bases as pyridine and diethyl amine; alkali metal carbonates and alkali metal bicarbonates. The inert organic solvent utilized in the present reaction may include any kind of well known solvent, provided that it does not affect the present reaction, for example hydrocarbon solvents, halogenated hydrocarbon solvents, alcohols, ketones and ethers. Though the present reaction may proceed only by standing the reaction mixture at the room temperature for long period of time, it is in general preferable to heat the mixture, for example at a certain temperature lower than the boiling point of the said solvent. Furthermore, the present reaction is preferably carried out in the presence of catalyst such as copper powder and cuprous salts, in good yield.

When the reaction is over, the precipitated alkali metal chloride or hydrochloric acid salt of organic base is filtered off, or alternatively, adequate quantities of water are added to the reaction mixture to dissolve the by-produced salts and water layer is separated off, and then the organic layer is evaporated in vacuo to obtain the objective compound as a residue. By the above-mentioned procedure, a sufficiently purified compound for most practical uses may be obtained, but, if necessary, thus obtained compound may be further purified by vacuum distillation and/or column-chromatography. Generally, as the present compound is accompanied with some extents of decomposition in heating, it may be practical to use without such purification.

Thus obtained O,O-dimethyl-O-(3-methyl-4-nitrophenyl) thionophosphate of the present invention is a pale yellow oily product having such physical properties as a refractive index $n_D^{31}$ 1.5498 and B.P. 140–145° C./0.1 mm. Hg (accompanying decomposition), and this compound is very soluble in alcohols, ethers, ketones and aromatic hydrocarbons, hardly soluble in aliphatic hydrocarbons and insoluble in water.

The following is the description on the toxicity of O,O-dimethyl-O-(3-methyl - 4 - nitrophenyl) thionophosphate of this invention. The toxicity ($LD_{50}$ value) towards mouse of the present compound is compared with that of parathion, varying their administration routes and the results are shown in Table 1.

*Table 1*

| Route | Compound of the invention, mg./kg. | Parathion, mg./kg. |
|---|---|---|
| Oral administration | 870 | 9.5 |
| Subcutaneous administration | 1,000 | 11.5 |
| Intraperitoneal administration | 280 | 6.0 |
| Dermal application | >3,000 | 120 |

The following Table 2 shows the toxic values of the compound of the present invention and of parathion using various kinds of test animals by oral administration route ($LD_{50}$, mg./kg. of body weight).

*Table 2*

| Animal | Compound of the invention | Parathion |
|---|---|---|
| Rats | ♂242, ♀433 | 8.5 |
| Guinea pigs | 1,833 | 12.5 |
| Cats | 142.3 | 0.93 |

Further, an outstanding characteristic of low toxicity of the present compound will be apparent from the following Table 3. In the Table 3, the toxic values towards mouse and the relative efficacies towards rice stem borer (*Chilo suppressalis* Walker) of the compound of the present invention and of the known, practically utilized insecticides are shown. *Table 3*

| Compound (name) | Oral toxicity towards mouse $LD_{50}$, mg./kg. | Relative efficacy towards rice stem borer [1] |
|---|---|---|
|  (Parathion) | 6–10 | 100 |
|  (Methyl parathion) | 20–30 | 100 |
|  (EPN) | 15–20 | 90 |
| 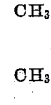 (Dipterex) | 300–400 | 50 |
|  (Chlorthion) | 300–350 | 25 |
| 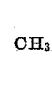 (Dicapthon) | 300–350 | 50 |
|  (Compound of the invention) | 700–900 | 100 |

[1] The relative efficacy towards rice stem borer was determined by the so-called pot test by spraying the test medium on the second generated larvae of the insect and each value was set forth by comparing the efficacy of the test compound towards rice stem borer with that of parathion (=100). The pot test was conducted in the following manner. The rice plants, 45–50 days after planting thereof, were transplanted into a porcelain pot (whose surface area was 1⁄5000 are) and at the end of 60–70 days thereafter, rice stem borer eggs were applied to the plants. The thus heated pots were settled in a hatching room. After 4 days from the hatching of the insects, each pot was sprayed with an emulsion of the test compound made by dilution of 50% emulsifiable concentrate composition (comprised of 50 parts active ingredient, 35 parts Triton X–100 (a polyethylene glycol nonylphenyl-ether, made by Rohm & Haas Co., U.S.A.) and 15 parts xylene, by weight) with water.

By changing the concentration of the solution to be employed, the numerical values necessary for killing 85% of the insects were determined and the comparative efficacy was calculated for each compound. These tests were repeated 5 times with each compound and their mean values were calculated.

O,O-dimethyl-O-(3-methyl-4-nitrophenyl) thionophosphate of the present invention occupies a unique position among other isomers, homologues and analogues of the compound as regards correlation of the toxicity and the insecticidal activity, and these facts are shown in the following Table 4.

Table 4

| Compound | Oral toxicity towards mouse, $LD_{50}$ (mg./kg.) | Hibernating larvae of rice stem borer, topical method [1] | | | | Azuki bean weevils, dipping, $LC_{50}$ (p.p.m.) [2] |
|---|---|---|---|---|---|---|
| | | 20γ/ larva | 6.7γ/ larva | 2γ/ larva | 0.67γ/ larva | |
| $(CH_3O)_2P(S)$-O-(2-CH_3, 4-NO_2-phenyl) (Compound of the invention) | 700–900 | 100 | 100 | 100 | 100 | 16.7 |
| $(C_2H_5O)_2P(S)$-O-(2-CH_3, 4-NO_2-phenyl) | 17.5 | 100 | 100 | 100 | 60 | 5.2 |
| $(CH_3O)_2P(O)$-O-(2-CH_3, 4-NO_2-phenyl) | 20 | 100 | 100 | 100 | 100 | 83.0 |
| $(C_2H_5O)_2P(O)$-O-(2-CH_3, 4-NO_2-phenyl) | 7.4 | 100 | 100 | 100 | 70 | 66.4 |
| $(CH_3O)_2P(S)$-O-(2-CH_3, 6-NO_2-phenyl) | 920 | 30 | 0 | 0 | 0 | 20.0 |
| $(C_2H_5O)_2P(S)$-O-(2-CH_3, 6-NO_2-phenyl) | 64 | 0 | 0 | 0 | 0 | 300 |
| $(CH_3O)_2P(O)$-O-(2-CH_3, 6-NO_2-phenyl) | 60–70 | 20 | 0 | 0 | 0 | 77 |
| $(C_2H_5O)_2P(O)$-O-(2-CH_3, 6-NO_2-phenyl) | 40 | 0 | 0 | 0 | 0 | 450 |
| $(CH_3O)_2P(S)$-O-(2-NO_2, 4-CH_3-phenyl) | 890 | 70 | 30 | 0 | 0 | 4,170 |
| $(C_2H_5O)_2P(S)$-O-(2-NO_2, 4-CH_3-phenyl) | 54 | 80 | 30 | 0 | 0 | 1,540 |
| $(C_2H_5O)_2P(S)$-O-(2-NO_2, 6-NO_2-phenyl) | 530 | 0 | 0 | 0 | 0 | Noneffective |
| $(C_2H_5O)_2P(O)$-O-(2-NO_2, 6-CH_3-phenyl) | 72 | 100 | 70 | 40 | 0 | Noneffective |
| $(C_6H_5CH_2O)_2P(S)$-O-(2-CH_3, 4-NO_2-phenyl) | >1,000 | 0 | 0 | 0 | 0 | Noneffective |

[1] Topical test was conducted by using hibernating larvae of rice stem borer as follows. Each compound was dissolved in acetone to prepare a series of acetone solutions containing from 0.067 to 2% of the said compound (g./cc.). Each 1/1000 cc. of the said solution was applied to the body of the larva by means of micrometer syringe and, after keeping it for 3 days at 25° C, its death or survival condition was observed. The larvae utilized in this test had almost the same body weights ranging from 80 to 90 mg. and each solution was applied to a group of these 20 larvae in order to calculate the mean fatal percent.

[2] The dipping test was conducted by using Azuki bean weevils as follows: That is, emulsifiable concentrate having the same composition with that of the afore-said pot test (see Table 3) was prepared on each compound and the concentrate was diluted with water to obtain various concentrations of the test emulsions (ca. 1/100–1/100,000). In these emulsions, each group of 30 weevils was dipped for 1 minute and then transferred to a Petri dish having a sheet of filter paper at the bottom.

After standing overnight at 25° C., the dead and the survival numbers of the weevils were counted. This experiment was triplicated and $LC_{50}$ value was calculated based upon the concentration utilized and the kill percent, on each compound.

The following Table 5 shows the comparative efficacies towards rice stem borer of the compound of the invention and of the typical currently employed insecticidal compounds, in greater detail.

Table 5

TOPICAL APPLICATION TOWARDS HIBERNATING LARVAE OF RICE STEM BORER [1]

|  | 20 γ/ larva | 6.7 γ/ larva | 2 γ/ larva | 0.67 γ/ larva | 0.2 γ/ larva |
|---|---|---|---|---|---|
| Compound of the invention | 100 | 100 | 100 | 100 | 60 |
| Parathion | 100 | 100 | 100 | 90 | 50 |

[1] See footnote 1, table 4.

invention also possess an excellent efficacy towards paddy borer, purplish stem borer and other borers attacking rice plant. While the compositions of the present invention show, as described hereinbefore, an outstanding practicability for the control of borers of rice compared with that of any other conventional insecticides, they further have superior efficacies towards common agricultural pests belonging to the order such as Lepidoptera, Diptera, Hemiptera, Siphonoptera, Orthoptera and Coleoptera and other various sanitary pests.

In order to make clear the effectiveness of the compound of the present invention towards sanitary pests, Table 6 shows the comparative efficacies towards house fly and its larva (maggot), of the compound and of the conventionally utilized, low toxic insecticides. In this test, an emulsifiable concentrate was prepared by mixing 50 parts by weight of an active ingredient, 30 parts by weight of Triton X-100 and 20 parts by weight of xylene, and the concentrate was diluted with water to make a test emulsion.

Table 6

| Compound | Concentration,[1] g/100 cc. | Adult[2] fly, kill percent | Maggot,[3] kill percent | Spraying to generative place[4] | | | | | |
|---|---|---|---|---|---|---|---|---|---|
|  |  |  |  | The day | After 1 day | After 2 days | After 3 days | After 4 days | After 7 days |
| Compound of the invention | 0.25 | 99.5 | 98.4 | 100 | 89.2 | 85.2 | 81.3 | 73.0 | 15.1 |
| Malathion | 1.00 | 99.5 | 95.0 | 100 | 78.5 | 59.2 | 43.0 | 36.9 | 12.8 |
| Diazinon | 0.125 | 99.5 | 99.0 | 100 | 93.6 | 84.0 | 91.3 | 87.2 | 50.0 |
| Dipterex | 0.5 | 67.6 | 97.4 | 100 | 97.0 | 51.3 | 25.2 | 8.2 | |
| DDVP | 0.5 | 99.5 | 94.7 | 98.8 | 85.2 | 18.1 | 8.2 | | |
| Baytex | 0.125 | 58.1 | 95.7 | 97.8 | 78.9 | 63.4 | 64.4 | 73.2 | 12.1 |
| Dicapthon | 0.25 | 100 | 93.8 | 100 | 93.5 | 61.8 | 52.6 | 44.6 | 12.3 |
| Dimethoate | 0.0312 | 63.9 | 98.2 | 96.5 | 96.3 | 95.5 | 100 | 98.5 | 65.3 |
| Untreated | | 8.6 | 3.5 | 1.7 | 0.6 | 0.8 | 2.0 | 2.3 | 2.1 |

[1] The concentration, g./100 cc., shows the amounts (g.) of the active ingredient contained in 100 cc. of the test emulsion, and these values shown in this item were adequately chosen so that the kill percent of maggot came to more than 90%.
[2] By means of the settling tower method. (Cf. Bull. Ent. Res. 14, 223 (1924).)
[3] By means of the beaker method. That is, a culture ground of house fly was settled into a beaker having an inner diameter of about 9 cm. and a height of about 10 cm., and eggs of house fly were blowed thereon. Two days later, 1 cc. of the test emulsion was sprayed on the surface of the ground, and after 7 days standing the dead and the survival numbers of the larvae (maggots) were calculated.
[4] About 300 g. of matured culture medium for the larva (maggot) of house fly was taken in a dish having an inner diameter of about 15 cm. and a height of about 8 cm., and 5 g. of sugar was added thereto and mixed well. To the dish, which was regarded as an artificial generative place, 1 cc. of the test emulsion was sprayed. After that, adult flies were put therein every day and their vital states were observed. This experiment is concerned with the residual effectiveness of the test compound.

The following Table 7 shows the insecticidal activity of the compound of the invention towards other pests than the above described injurious insects.

Table 7

| Pest | Crop | Formulation | Concentration of the actual ingredient (kg./l.) | Type of application | Effect |
|---|---|---|---|---|---|
| Chrysanthemum aphid | Chrysanthemum. | 50.E.[1] | 1/16,000 | Spray | 100% kill. |
| Green peach aphid | Radish | 50.E.[1] | 1/16,000 | do | Do. |
| Green leafhopper | Rice | 50.E.[1] | 1/2,000 | do | Do. |
| Green rice leafhopper | do | 50.E.[1] | 1/6,000 | do | Do. |
| Black rice bug | do | 50.E.[1] | 1/2,000 | do | Do. |
| Common cabbage worm | Cabbage | 50.E.[1] | 1/4,000 | Foliage spray | Effective 10 days later. |

[1] "50.E." means an emulsifiable concentrate containing 50 parts by weight of the compound of the invention, 20 parts by weight of xylene, and 30 parts by weight of Triton X-100 (a polyethylene glycol nonylphenyl ether, made by Rohm & Haas Co.).

POT-TEST TOWARDS THE SECOND GENERATED LARVAE OF RICE STEM BORER

[Spraying towards the borer encroaching in a rice plant]

|  |  | 1/1000 | 1/2000 | 1/4000 |
|---|---|---|---|---|
| Spray 2 days later from the encroachment. | Compound of the invention. | 99.7 | 99.8 | 95.2 |
|  | Dipterex | 99.4 | 88.7 | 92.1 |
|  | Parathion | 99.5 | 87.0 | 86.4 |
| Spray 3 days later from the encroachment. | Compound of the invention. | 98.6 | 96.5 | 86.5 |
|  | Dipterex | 100 | 98.5 | 82.6 |
|  | Parathion | 100 | 100 | 95.4 |
| Spray 8 days later from the encroachment. | Compound of the invention. | 100 | 100 |  |
|  | Dipterex | 80.0 | 63.5 |  |
|  | Parathion | 91.5 | 55.6 |  |

Besides rice stem borer, the compound of the present

In order to prepare formulations containing O,O-dimethyl-O-(3-methyl-4-nitrophenyl) thionophosphate for practical use, various inert carriers may be combined therewith to make an insecticidal composition containing a toxic quantity of the said compound. As for the said compositions, such formulations as emulsion, suspension, dust and oil preparation may be included.

The emulsified preparation of the said compound may be prepared, for example, by mixing the compound with an organic solvent and a surface active agent in a proper proportion to make an emulsifiable concentrate and by diluting thus obtained concentrate with water at the time of practical use. As the organic solvent, an aromatic hydrocarbon such as benzene and xylene may preferably be utilized and as the surface active agent, almost all kinds of nonionic surface active agents may successfully be employed. The mixing ratio of these ingredients can freely be selected according to the material to be utilized and to the object of the preparation. However, in general, 50 weight parts of the active compound used in the present invention may adequately be combined with 20 weight parts of a solvent and 30 weight parts of a surface active agent to obtain a good emulsifiable concentrate. In some cases, the active compound used in the present invention may be combined merely with a nonionic surface active agent to obtain an emulsifiable concentrate. At the time of practical use, the said concentrate will be diluted with an adequate quantity of water to make emulsion and thus obtained emulsion will be sprayed directly.

In case of wettable powder, the active compound used in the present invention is mixed with a nonionic surface active agent in an adequate proportion and is further combined with a powdered carrier. As the surface active agent, almost all sorts of nonionic surface active agents may successfully be employed, and as the powdered carrier, such carriers as talc, kaolin, bentonite, diatomaceous earth and Japanese acid clay may be utilized. As for the said powdered carrier, it is preferable to use such a carrier as having more than 200 mesh particle size. The mixing ratio of these ingredients in the said wettable powder can preferably be determined so as to contain from 5 to 25 weight percent of the active compound ingredient of the present invention, from 5 to 10 weight percent of the surface active agent and the remaining weight percent of the powdered carrier, but these ratios may freely be varied in accordance with the application objects of the preparation. A suitable suspension for practical use may easily be prepared from the said wettable powder merely by putting them into water.

When an adequate amount of the present active compound is admixed with a powdered carrier, a dust formulation may be obtained. In this case, it may be prepared by admixing both parties directly, but preferably, the active compound used in the present invention may be dissolved in a solvent having a lower boiling point, and admixed with the carrier, followed by distillation of the solvent to obtain the dust formulation. In the said dust formulation, it is preferable to contain from 1 to 5% by weight of the said active compound. As for the carrier, such material as already described under the item of the wettable powder as the powdered carrier may successfully be utilized.

Further, the active compound used in the invention may be dissolved in such a solvent as deodorized kerosene to make an oil preparation having a proper concentration. The solubility of the present compound in kerosene is rather poor so that one may use at the same time a co-solvent in case of need. As for the said co-solvent, such aromatic hydrocarbon solvent as benzene, xylene and methylnaphthalene may preferably be employed.

As for the manufacturing method of the insecticide containing the active compound used in this invention, besides the above described recipes, it would be apparent to those skilled in the art that any recipe might be utilized according to the common methods for preparing organo phosphorus insecticides. Moreover, the insecticidal compositions of the present invention may satisfactorily be compounded with other material such as an active ingredient of another type of insecticide, a fungicidal and a herbicidal component so far as it is compatible with the compound of the invention.

When the above described insecticidal composition of the present invention is practically utilized for the purpose of killing noxious insects, the said composition is applied to the insects in such a way as an insecticidal quantity of O,O - dimethyl - O-(3-methyl-4-nitrophenyl) thionophosphate of the present invention may come into contact with the objective insects. For example, in case of using 50% emulsifiable concentrate, it may be enough for the substantially perfect kill of borers of rice to employ from 70 to 80 liters of 1/2000 diluted emulsion per 10 ares for the first generated larvae and to employ from 90 to 180 liters of 1/1000 diluted emulsion per 10 ares for the second generated larvae. In case of dust formulation containing 1.5% of the compound of the present invention, from 3 to 4 kg. of the said dust per 10 ares may advantageously be applied to the first generated larvae of borers of rice and from 5 to 6 kg. per 10 ares may be enough for the second generated larvae. And in case of using wettable powder containing 25% of the compound of the invention, the following ratio may be adequate for the control of borers of rice; 70–80 liters of 1/1000 aqueous suspension of the said wettable powder per 10 ares for the first generated larvae and 90–180 liters of 1/500 aqueous suspension per 10 ares for the second generated larvae of borers of rice.

The present invention will be illustrated by the following examples, without, however, being limited thereto. Unless otherwise provided, all parts are by weight.

EXAMPLE 1

To a mixture of 30.6 g. of 3-methyl-4-nitrophenol and 27.6 g. of anhydrous potassium carbonate in 200 cc. of methyl isobutyl ketone, 32.2 g. of O,O-dimethyl chlorothionophosphate was added drop by drop at 60° C. under stirring. After the dropping of the phosphate is over, stirring of the mixture was further continued for 8 hours at 60–80° C. to complete the reaction. Water was added to dissolve the precipitated inorganic compound, the organic layer was separated, washed with water and dried over anhydrous sodium sulfate. After distilling off the methyl isobutyl ketone in vacuo, 48.8 g. of reddish brown oil product was obtained. For further purification, the crude product was subjected to column-chromatography using active carbon and active alumina, obtaining a pale yellow oily product having a refractive index $n_D^{31}$ 1.5498.

*Analysis.*—Calculated (for $C_9H_{12}NO_5PS$): P, 11.2%; S, 11.6%; N, 5.05%. Found: P, 11.3%; S, 11.4%; N, 5.11%.

EXAMPLE 2

To a mixture of 30.6 g. of 3-methyl-4-nitrophenol, 32.2 g. of O,O-dimethyl chlorothionophosphate, and 0.1 g. of cuprous chloride in 100 ml. of toluene heated at 60° C., there was added 27.6 g. of anhydrous potassium carbonate in small portions. The water resulting during the reaction is distilled off azeotropically with the toluene together with the resulting carbon dioxide. After completion of the reaction, the reaction product is treated by the same procedure as that of Example 1, yielding almost the same amount of the objective product.

EXAMPLE 3

The procedure of Example 1 was repeated except that the corresponding amount of sodium 3-methyl-4-nitrophenolate was employed in place of 3-methyl-4-nitrophenol and anhydrous potassium carbonate, and that chlorobenzene was utilized as the solvent instead of the methyl isobutyl ketone. The same result was obtained as that of the preceding examples.

EXAMPLE 4

Fifty parts of O,O - dimethyl-O-(3-methyl-4-nitrophenyl) thionophosphate was combined with 35 parts of Triton X–100 (a polyethylene glycol nonylphenyl ether, made by Rohm & Haas Co., U.S.A.) and 15 parts of xylene in the described order to make a uniform emulsifiable concentrate. The rice plants after 20 days from their sowing were transplanted into the Wagner-pot having a surface area of 1/50,000 of 10 ares, each four plants a pot. After 2 months, these plants were infested with rice stem borers and, 3 days later from the encroachment of the pests, 10 cc. of 1/1000 diluted emulsion of the said 50% emulsifiable concentrate was sprayed per pot. Almost

EXAMPLE 5

One and a half parts of O,O-dimethyl-O-(3-methyl-4-nitrophenyl) thionophosphate was dissolved in 20 parts of acetone and the acetone solution was thoroughly admixed with 98.5 parts of 200 mesh talc. Evaporation of the solvent gave 1.5% dust formulation. To the rice plants having the same conditions as in Example 1, eggs of rice stem borers were applied and 3 days later from their encroachment the pot was settled into the belljar duster, sprayed with 0.2 g. of the said dust, taken out after 30 minutes, and left alone. Almost 100% of the borers encroaching in the stem were killed in 3 days.

EXAMPLE 6

Thirty parts of O,O-dimethyl-O-(3-methyl-4-nitrophenyl) thionophosphate and 10 parts of Triton X–100 were mixed thoroughly with each other and the other and the combined mixture was added dropwise into 60 parts of 200 mesh talc in a ball mill and mixed therewith to obtain a wettable powder. To the rice plants having the same conditions as in Example 1, eggs of rice stem borers were applied and after 3 days from their encroachment 10 cc. of 1/600 aqueous suspension of the said wettable powder was sprayed per pot. Almost 100% of the borers encroaching in the stem were killed in 3 days.

EXAMPLE 7

One and a half parts of O,O-dimethyl-O-(3-methyl-4-nitrophenyl) thionophosphate was dissolved into 20 parts of Velsicol AR–50 (a kind of aromatic hydrocarbon solvent manufactured by Velsicol Corp., U.S.A.) and to the mixture 78.5 parts of Deobase (deodorized hydrocarbon solvent manufactured by L. Sonneborn & Sons, Inc., U.S.A.) was added to obtain an oil preparation. When 60 cc. of the said oil was sprayed on one square meter of the favorite haunt of fles such as a dumping ground, almost 100% of the fly maggots growing within the said place were killed in 48 hours.

EXAMPLE 8

Field tests were carried out with first generated larvae of rice stem borers using the emulsifiiable concentrate prepared as in Example 4, and the similar emulsifiable concentrate of parathion having concentration of 50%. The emulsifiable concentrates diluted as identified in the following table were sprayed on rices after 20 days from their transplantation, the sprayed amount being 7 liters/are. After 2 weeks from the spraying, the effectiveness is observed, giving the following results. The test was triplicated, and the mean values were calculated.

| Ingredient | Average number of stems per stock | Average number of damaged stems per stock | Percent damage |
|---|---|---|---|
| Untreated | 22.30 | 1.66 | 7.5 |
| Parathion (1/4,000 kg./liter) | 22.47 | 0.48 | 2.2 |
| Compound of the invention (1/2,000 kg./liter) | 22.65 | 0.35 | 1.5 |
| Same (1/4,000 kg./liter) | 20.59 | 0.28 | 1.4 |

EXAMPLE 9

Field tests were carried out with first generated larvae of paddy borers using the emulsifiable concentrate prepared as in Example 4, and the similar emulsifiable concentrates of Dipterex and parathion having concentration of each 50%. The emulsifiable concentrates diluted as identified in the following table were sprayed on rices after 20 days from their transplantation, the sprayed amount being 7 liters/are. After 3 weeks from the spraying, the effectiveness is observed, giving the following results. The test was duplicated, and the mean values were calculated.

| Ingredient: | Number of survival larvae per are |
|---|---|
| Dipterex (1/1,000 kg./liter) | 36.5 |
| Parathion (1/2,000 kg./liter) | 10.5 |
| Compound of the invention (1/2,000 kg./liter) | 5.5 |
| Untreated | 35.0 |

We claim:
1. An insecticidal composition comprising an inert carrier, a surfactant, and as the essential active ingredient O,O-dimethyl-O-(3-methyl-4-nitrophenyl) thionophosphate.

2. An insecticidal composition comprising an emulsion of a toxic quantity of O,O-dimethyl-O-(3-methyl-4-nitrophenyl) thionophosphate.

3. An insecticidal composition comprising an aqueous suspension of a wettable powder containing a toxic quantity of O,O-dimethyl-O-(3-methyl-4-nitrophenyl) thionophosphate.

4. A method of killing insects which comprises contacting the insects with an insecticidal quantity of O,O-dimethyl-O-(3-methyl-4-nitrophenyl) thionophosphate.

5. A method of killing borers of rice which comprises contacting the borers of rice with an insecticidal quantity of O,O-dimethyl-O-(3-methyl-4-nitrophenyl) thionophosphate.

6. A method of killing house fly which comprises contacting the house fly with an insecticidal quantity of O,O - dimethyl - O - (3 - methyl - 4 - nitrophenyl) thionophosphate.

7. A method of killing larva of house fly which comprises contacting the larva of house fly with an insecticidal quantity of O,O-dimethyl-O-(3-methyl-4-nitrophenyl) thionophosphate.

8. In a method of killing insects by contacting the insects with an insecticidal quantity of an insecticidally active compound, the improvement wherein said active compound is O,O-dimethyl-O-(3-methyl-4-nitrophenyl) thionophosphate.

References Cited in the file of this patent

UNITED STATES PATENTS

| 2,668,831 | Tolkmith | Feb. 9, 1954 |
| 2,712,029 | Winkle | June 28, 1955 |
| 2,887,505 | Blair | May 19, 1959 |
| 2,915,429 | Scherer | Dec. 1, 1959 |
| 2,920,993 | Fairchild | Jan. 12, 1960 |